Jan. 10, 1928.
F. C. BIRKHOLTZ
1,656,032
SPOOL HEAD
Filed March 10, 1926
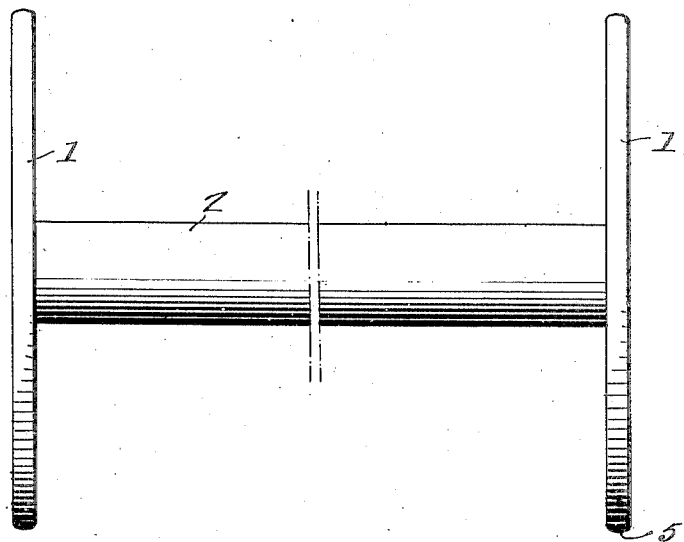
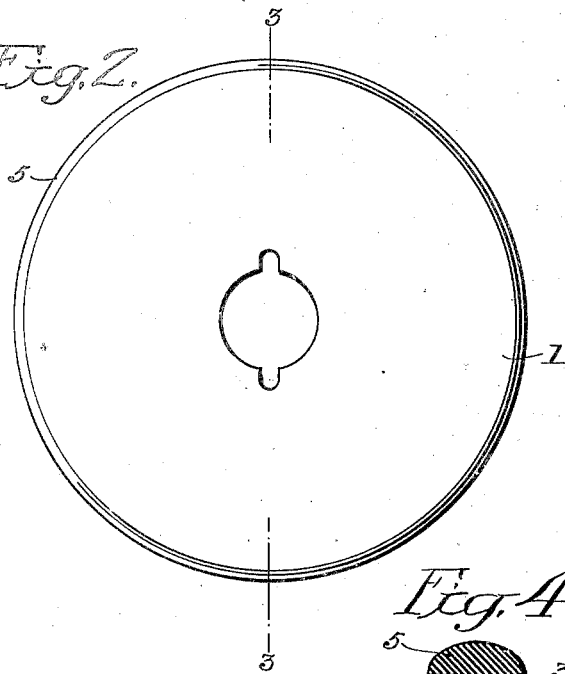
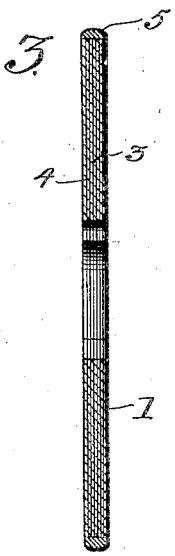
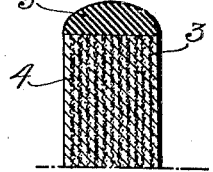
Inventor:
Fred Carl Birkholtz,
by his Attorneys.

Patented Jan. 10, 1928.

1,656,032

UNITED STATES PATENT OFFICE.

FRED CARL BIRKHOLTZ, OF MERCERVILLE, NEW JERSEY, ASSIGNOR TO THERMOID RUBBER COMPANY, OF HAMILTON TOWNSHIP, NEW JERSEY, A CORPORATION OF NEW JERSEY.

SPOOL HEAD.

Application filed March 10, 1926. Serial No. 93,722.

The object of my invention is to improve the construction of the head of spools used in mills for winding rovings and other fibres. These spools are usually large and are subjected to rough usage.

The invention is especially adapted for use on spools known as "jack spools", upon which the rovings are wound as they come from the carding machines.

In the accompanying drawing:

Fig. 1 is a side view of a spool illustrating my invention;

Fig. 2 is a detached end view of one of the heads;

Fig. 3 is a sectional view on the line 3—3, Fig. 2; and

Fig. 4 is an enlarged sectional view illustrating the rubber edge.

The spool is of the ordinary shape and size and has two heads 1—1 connected by a body spindle 2. Each head has a body portion made of a series of plies of fabric 3, and a vulcanizable composition 4 such as rubber, the rubber and fabric being built up ply upon ply until the head is of the thickness desired, then the solid rubber edge 5 secured to the edge of the body portion and the entire head is placed in a mold and vulcanized. The solid rubber edge is made of pliable rubber and is preferably rounded as shown.

It has been found that a spool-head made in the manner described will withstand considerable rough usage, and a spool can be dropped upon a hard floor without flattening or otherwise distorting the edge of the spool, and as the body of the head is a laminated structure of fabric and rubber, it will not warp out of shape or crack.

I claim:—

1. A head for a spool made of fabric and rubber composition and having a peripheral portion of pliable rubber, integral with the head.

2. A head for a spool having a body portion made of a series of plies of fabric and vulcanizable rubber composition, and an integral pliable rubber edge encircling the body portion, the body portion and the rubber of the edge being moulded into shape and vulcanized.

FRED CARL BIRKHOLTZ.